United States Patent [19]
Nishida et al.

[11] Patent Number: 4,876,690
[45] Date of Patent: Oct. 24, 1989

[54] METAL VAPOR LASER APPARATUS

[75] Inventors: Naoto Nishida; Mitsuhiro Nishio, both of Yokohama, Japan

[73] Assignee: Kabushiki Kaisha Toshiba, Kawasaki, Japan

[21] Appl. No.: 286,864

[22] Filed: Dec. 20, 1988

[30] Foreign Application Priority Data

Dec. 24, 1987 [JP] Japan .................. 62-325362

[51] Int. Cl.⁴ ............... H01S 3/22; H01S 3/04
[52] U.S. Cl. ............................. 372/56; 372/34; 372/61; 372/107; 372/108
[58] Field of Search ............. 372/56, 55, 61, 34, 372/107, 108, 99, 33

[56] References Cited

U.S. PATENT DOCUMENTS

| 3,576,500 | 4/1971 | Gould et al. | 372/56 |
| 3,947,781 | 3/1976 | Hernqvist | 372/61 |
| 4,187,474 | 2/1980 | Hug et al. | 372/56 |
| 4,442,523 | 4/1984 | Bricks | 372/56 |
| 4,710,938 | 12/1987 | Fuke et al. | 372/61 |
| 4,730,323 | 3/1988 | Seaton | 372/34 |
| 4,740,988 | 4/1988 | Knollenberg et al. | 372/34 |

Primary Examiner—William L. Sikes
Assistant Examiner—Georgia Y. Epps
Attorney, Agent, or Firm—Cushman, Darby & Cushman

[57] ABSTRACT

A metal vapor laser apparatus of this invention includes at least two high reflecting mirrors arranged one near each side end portion of a discharge tube, heating units for heating the high reflecting mirrors, and transmission windows formed to transmit a laser beam reflected by the high reflecting mirrors.

9 Claims, 1 Drawing Sheet

METAL VAPOR LASER APPARATUS

BACKGROUND OF THE INVENTION

1. Field of the Invention

The present invention relates to a laser apparatus and, more particularly, to a metal vapor laser apparatus using, e.g., copper as a laser medium.

2. Description of the Related Art

In recent years, a metal vapor laser has attracted attention as a light source used in uranium enrichment. In the uranium enrichment process, $_{92}^{235}U$, serve which is used as a fuel for electric power generation by means of nuclear fission, is separated from natural uranium and is enriched. Since an abundance of $_{92}^{235}U$ is 0.7% in natural uranium, must be enriched to be about 3% in order to be use as nuclear fuel. For this purpose, in an uranium enrichment atom method using a laser beam, only $_{92}^{235}U$ is excited and ionized by a dye laser or the like, separated by an electrode applied with a voltage. In this case, the dye laser is a special laser in which in order to oscillate a dye laser beam, another type of laser beam is used. That is, in order to excite a laser medium of the dye laser, another type of laser beam is used. An example of the laser used for oscillating the dye laser beam is a metal vapor laser. An example of the metal vapor laser for dye laser excitation is a copper vapor laser.

FIG. 1 shows a conventional metal vapor laser apparatus. The apparatus shown in FIG. 1 has discharge tube 102, the interior of which is kept airtight, heat insulating member 106 which is inserted in tube 102, and cylindrical airtight vessel 104 which is arranged outside member 106, concentric therewith. Cylindrical core tube 108 is located inside member 106. A metal vapor source, e.g., a plurality of grains of copper materials 110 are located inside tube 108. Substantially annular electrodes 112 and 114 are located at both ends of tube 108 and member 106. Each of electrodes 112 and 114 has an L-shaped section along a plane including an optical axis. Electrodes 112 and 114 are connected to electric wires 116 extending from power source unit 118. In order to reliably insulate electrodes 112 and 114, from each other, annular high-voltage insulating member 120 is formed to be in contact with electrode 112 and vessel 104. Two transmission windows 122 for transmitting a laser beam are arranged at both ends of discharge tube 102 sealed by sealing members 123, respectively. In this case, each window 122 is arranged to form a Brewster angle with respect to the optical axis. High reflecting mirror 124 is arranged next to one of windows 122, to reflect a laser beam transmitted through this window, while output mirror 126 is arranged next to the other window 122. Cooling pipe 128 is wound around the outer surface of tube 102. Gas supply unit 130 is located at one end of tube 102, and vacuum pump 132 is located at its other end.

The conventional metal vapor laser apparatus having the above arrangement oscillates a laser beam as follows:

First, pump 132 is activated to evacuate tube 102 so as to obtain a negative pressure therein. A buffer gas is then supplied from gas supply unit 130 to tube 102, after which an electrical discharge is generated between electrodes 112 and 114 by, for example, a pulse voltage applied from power source unit 118. Copper materials 110 as a metal vapor source are heated by this discharge. Heated copper materials 110 is partially evaporated to be metal atoms and diffused in tube 102. In the above state, the buffer gas is ionized or excited by discharge. When the buffer gas collides against the metal atoms, energy is transferred to the metal atoms to excite them. The excited metal atoms transit to generate a laser beam. This laser beam is resonated and amplified between mirrors 124 and 126. As a result, a laser beam is emitted from mirror 126.

In the metal vapor laser apparatus which emits a laser beam as described above, core tube 108 is heated by electrical discharge between electrodes 112 and 114. The temperature of tube 108 is heated to a thousand and several hundreds degrees. Sealing members 123 are used, however, in order to airtightly mount windows 122 on tube 102. In this case, a material of sealing members 123 must be kept at a temperature of 200° C. or less. For this reason, a very high temperature portion and a relatively low temperature portion are simultaneously present in the metal vapor laser apparatus. Therefore, the metal evaporated at the high temperature portion is solidified at the low temperature portion. In particular, since two windows 122 against which a metal vapor evaporated at tube 108 as the high temperature portion tends to collide are kept at a low temperature, the metal is solidified and adhered thereon. As a result, the transmission windows are contaminated by the metal vapor and their light transmittivity is reduced over time. If the transmittivity of the windows is reduced, an oscillation efficiency of a laser beam is reduced. This oscillation efficiency reduction poses a problem of reduction in service life of the metal vapor laser apparatus.

In order to solve the above problem, the transmission windows may be sufficiently separated from the core tube. In this method, however, the overall length of the discharge tube is increased to undesirably enlarge the apparatus. In addition, problems such as degradation in a short pulse laser beam quality or ASE (Amplified Spontaneous Emission) are posed.

SUMMARY OF THE INVENTION

The present invention has been made in consideration of the above situation and has as its object to provide a metal vapor laser apparatus which can prevent contamination of transmission windows caused by adhesion of a metal vapor without enlarging the laser apparatus itself and can therefore oscillate a laser beam for a long time period with high efficiency.

The above object of the present invention is achieved by the following metal vapor laser apparatus. That is, the metal vapor laser apparatus comprises a discharge tube, two electrodes arranged in the discharge tube, a power source means for applying a voltage to the electrodes, a metal vapor source arranged in the discharge tube, two high reflecting mirrors arranged one near each end portion of the discharge tube, a heating means for heating the high reflecting mirrors, transmission windows located in the discharge tube, and a pair of resonator mirrors. The interior of the discharge tube is kept airtight. The power source means applies a voltage to the two electrodes so that the electrodes generate electrical discharge. The two high reflecting mirrors oppose each other. The transmission windows allow transmission of a laser beam reflected by the high reflecting mirrors. The pair of resonator mirrors reflect and optically resonate the laser beam transmitted through the transmission window and oscillate the laser beam from one mirror.

According to the present invention, the two high reflecting mirrors to be heated are located near the both end portions in the discharge tube, and the transmission window is located at a position to which a metal vapor rarely flies. Therefore, the metal vapor is prevented from being solidified and adhered on the transmission windows. As a result, since light transmittivity of the transmission window is not much reduced as an operation time passes, a service life of the metal vapor laser apparatus can be prolonged.

DETAILED DESCRIPTION OF THE PREFERRED EMBODIMENT

An embodiment of the present invention will be described below with reference to FIG. 2.

Figure 1:
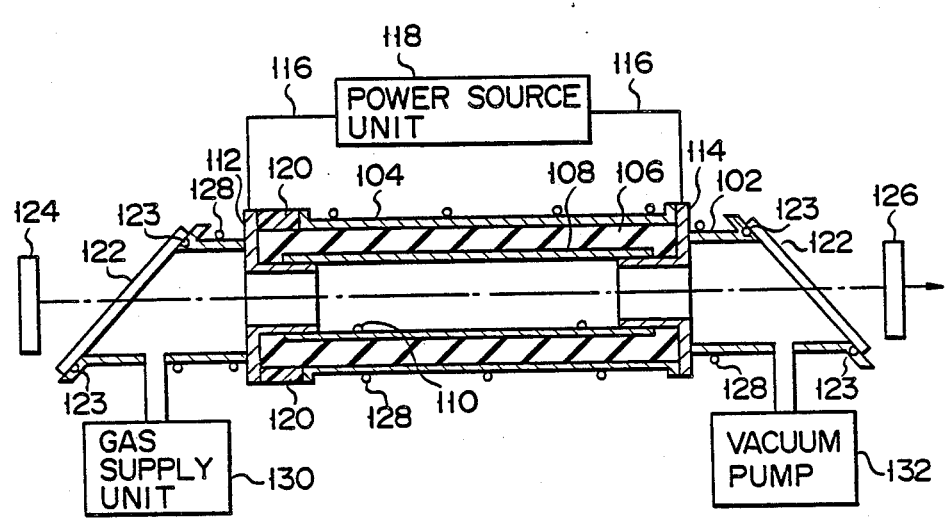
FIG. 1 is a longitudinal sectional view showing a conventional metal vapor laser apparatus.
Figure 2:
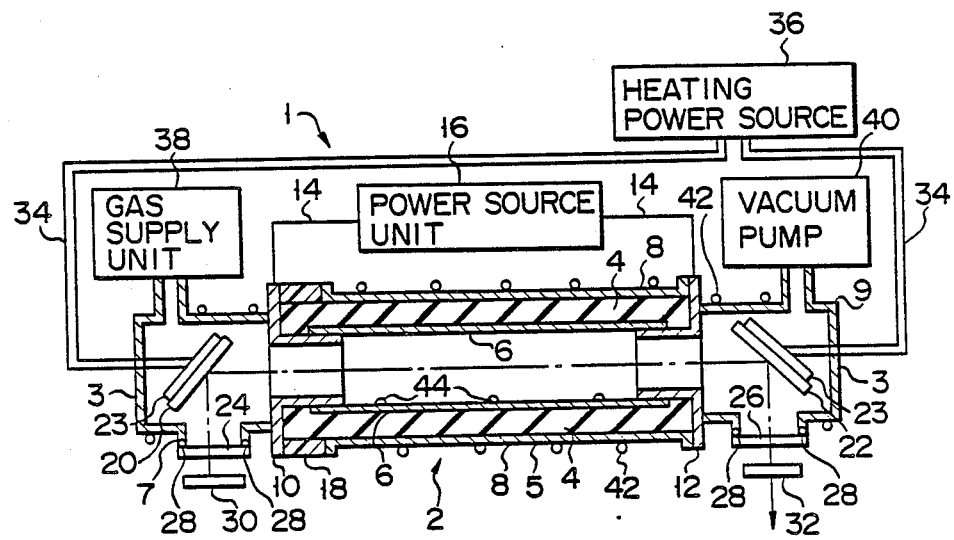
FIG. 2 is a longitudinal sectional view showing a metal vapor laser apparatus according to an embodiment of the present invention.

FIG. 2 shows a copper vapor laser apparatus as an embodiment of a metal vapor laser apparatus. First, a structure of the laser apparatus will be described below.

Copper vapor laser apparatus 1 comprises cylindrical discharge tube 2. Tube 2 consists of central portion 5 and two end portions 7 and 9. Two end portions 7 and 9 are detachably mounted on central portion 5. Wall surface 3 is mounted on each of portions 7 and 9 of tube 2 so that the interior of tube 2 is kept airtight. Heat insulating member 4 is inserted in an outer surface portion of central portion 5 of tube 2. Member 4 is made of zirconia fibers or alumina fibers. Cylindrical core tube 6 is located in an inner surface portion of member 4. Tube 6 is made of alumina ceramics. Airtight vessel 8 is located on an outer surface portion of member 4. Vessel 8 is made of copper. Substantially annular cathode and anode electrodes 10 and 12 are formed at both inside end portions of heat insulating member 4 and core tube 6. Electrodes 10 and 12 are connected to electric wires 14 extending from power source unit 16. Electrodes 10 and 12 oppose each other at the end portions of tube 6 and are exposed in discharge tube 2. In order to reliably insulate electrodes 10 and 12 from each other, annular high-voltage insulating member 18 is formed to be in contact with electrode 10 and airtight vessel 8. Member 18 is made of ceramics or plastics. High reflecting mirrors 20 and 22 are located in end portions 7 and 9 in tube 2, respectively. Mirrors 20 and 22 are made of Ni and arranged on an optical axis of a laser beam to be generated by electrical discharge between electrodes 10 and 12. Mirrors 20 and 22 are inclined through 45° with respect to the optical axis so as to reflect the laser beam. Heaters 23 are arranged behind mirrors 20 and 22. Heaters 23 are connected to heating power source 36 through wires 34. Transmission windows 24 and 26 are located on an optical path through which a laser beam reflected by mirrors 20 and 22 with a direction change through 90° passes. Windows 24 and 26 are airtightly mounted on discharge tube 2 by O-rings 28. High reflecting mirror 30 and output mirror 32 for amplifying the laser beam are located on the optical path of the laser beam transmitted through windows 24 and 26. Mirrors 30 and 32 are arranged perpendicularly to the optical axis. Gas supply unit 38 for supplying a buffer gas such as He gas or Ne gas is located at portion 7, and vacuum pump 40 is located at portion 9. Cooling pipe 42 for cooling is wound around the outer surface of tube 2. A plurality of grains of copper materials 44 as a laser medium are arranged inside tube 6.

Apparatus 1 having the above arrangement emits a laser beam as follows. First, pump 40 is activated to evacuate tube 2 to obtain a negative pressure therein. In this state, a buffer gas is supplied from gas supply unit 38. The buffer gas is filled in tube 2 to maintain several tens Torr therein. A pulse voltage is applied from power source unit 16 to cathode and anode electrodes 10 and 12 for electrical discharge and heating. Discharge is intermittently continued between electrodes 10 and 12 to heat discharge tube 6. Especially by heating tube 6, copper materials 44 are melted and evaporated as a copper vapor gas. The buffer gas is excited by discharge and collides against copper atoms so that energy of the gas is transferred to the copper atoms. The copper atoms are excited. As a result, the copper atoms transit between two energy levels to generate a laser beam. The generated laser beam is reflected by high reflecting mirrors 20 and 22 located in tube 2. An optical axis direction of the laser beam reflected by mirror 20 is changed through 90° because mirror 20 is inclined through 45° with respect to the optical axis. The reflected laser beam is incident on high reflecting mirror 30 through transmission window 24. Since mirror 30 is arranged perpendicularly to the optical axis, the incident laser beam is reflected along the same optical axis. The reflected laser beam is incident on mirror 20 through window 24. The laser beam incident on mirror 20 is reflected while its optical axis direction is changed through 90°. The laser beam propagates along an optical axis direction in core tube 8 and becomes incident on mirror 22. Since mirror 22 is similarly inclined through 45° with respect to the optical axis, the laser beam is reflected while its direction is changed through 90°. The reflected laser beam is incident on output mirror 32 through transmission window 26. Although mirror 32 is semitransparent, a laser beam is reflected if the laser beam output is weaker than a threshold level. The laser beam reflected by mirror 32 is incident on mirror 22 through window 26. The laser beam incident on mirror 22 is reflected and propagates along the optical axis in the core tube. The laser beam is amplified while it is reciprocated between mirrors 30 and 32. When the laser beam output is increased higher than a threshold level, a laser beam is emitted from mirror 32.

In apparatus 1, heaters 23 are located behind mirrors 20 and 22, respectively. Heaters 23 heat mirrors 20 and 22 to a temperature of, e.g., 1,100° C. Since a melting point of copper is 1,083° C., if copper atoms floating as vapor in tube 2 are adhered on mirrors 20 and 22, they are not solidified but remain in a liquid state. That is, even if a copper vapor is adhered on mirrors 20 and 22, it is not solidified because the temperature of mirrors 20 and 22 is higher than the melting point of copper but is removed from reflecting surfaces of mirrors 20 and 22 in a liquid state by gravity. Since heaters 23 uniformly heat the reflecting surfaces of mirrors 20 and 22, no local deformation occurs and therefore reflection of the laser beam is not adversely affected. The copper vapor is solidified at a relatively low temperature portion, e.g., near the end portions of tube 2. In addition, since windows 24 and 26 are separated from a tube axis of tube 2 to extend parallel to a tube axis direction, they are not exposed to portions of a high copper vapor density. Therefore, adhesion of the copper vapor can be minimized. As a result, since mirrors 20 and 22 can be located close to tube 6, the overall length of tube 2 can be reduced. Therefore, the number of times of oscillation of the laser beam between the mirrors while the medium is excited can be increased, and a conversion property of the laser beam can be improved.

Furthermore, in this laser apparatus, since the entire length of the resonator is defined between mirrors 30 and 32, it does not depend on the length of the discharge tube. Therefore, the length of the discharge tube can be reduced.

In the above embodiment, the copper vapor laser apparatus has been described as a metal vapor laser. The present invention is, however, not limited to the above embodiment but can be applied to a laser apparatus using another metal as a medium. In a laser apparatus using another metal, a heating temperature of mirrors 20 and 22 may be changed in consideration of a melting point of the metal. In this case, the heating temperature is set slightly higher than the melting point of the metal. The heating temperature need not be higher than the melting point of the metal used as a laser medium but may be a temperature relatively higher than an ambient temperature so that the metal as a laser medium is solidified not at mirrors 20 and 22 but at a lower temperature portion. Therefore, the heating temperature of mirrors 20 and 22 can be set to be, e.g., 200° to 300° C. which are relatively higher than an ambient temperature. Moreover, mirrors 20 and 22 made of Ni in the above embodiment may be formed by plating Ni or platinum on molybdenum or tungsten. Mirrors 20 and 22 are inclined through 45° with respect to the optical axis, but a variety of angles may be adopted for reflection. In addition, angles of mirrors 20 and 22 with respect to the optical axis need not be the same. In this case, the positions of the transmission windows can be changed. Furthermore, inclining directions of mirrors 20 and 22 with respect to the optical axis need not be on the same plane. Although transmission windows 24 and 26 are arranged perpendicularly to the optical axis, they may be arranged to form a Brewster angle with respect to the optical axis.

As has been described above, according to the present invention, the heating means are arranged behind the high reflecting mirrors, arranged in the discharge tube, for changing the optical axis direction of the laser beam through a predetermined angle. Therefore, a metal vapor is prevented from being solidified and adhered on the high reflecting mirrors. Therefore, according to the present invention, there is provided a metal vapor laser apparatus having a long service life in which the transmission windows are not contaminated and the high reflecting mirrors can reflect a laser beam with high reflectivity for a long time period.

What is claimed is:

1. A metal vapor laser apparatus comprising:
a discharge tube for generating a laser beam, said tube containing a buffer gas under a predetermined pressure and having at least one set of discharge electrodes;
power source means for applying a voltage to said electrodes;
a metal vapor source arranged in said tube;
two high reflecting mirrors for reflecting the laser beam in the direction crossing its optical axis, said high reflecting mirrors being arranged at both side end portions of said discharge tube to oppose each other;
heating means for heating said two high reflecting mirrors;
transmission windows for transmitting a laser beam reflected by said high reflecting mirrors, said windows being arranged in said discharge tube; and
a pair of resonator mirrors for emitting a laser beam which transits said transmission windows, said resonator mirrors being arranged outside of said tube.

2. An apparatus according to claim 1, wherein said high reflecting mirrors are inclined through 45° with respect to an optical axis in said discharge tube.

3. An apparatus according to claim 1, wherein said transmission windows are arranged perpendicular to an optical axis of a laser beam from said high reflecting mirrors.

4. An apparatus according to claim 1, wherein said transmission windows are arranged across an optical axis of a laser beam from said high reflecting mirrors and inclined to form a Brewster angle with respect to the axis.

5. An apparatus according to claim 1, wherein said heating means heat said high reflecting mirrors to a temperature of 1,100° C.

6. An apparatus according to claim 1, wherein said heating means heat said high reflecting mirrors to a temperature of 200° to 300° C.

7. An apparatus according to claim 1, wherein said metal vapor source is copper.

8. An apparatus according to claim 1, wherein said power source means generates a pulse voltage.

9. An apparatus according to claim 1, wherein said discharge tube has a central portion and two end portions including respectively said two high reflecting mirrors, said two end portions being detachable from said central portion.

* * * * *